United States Patent

[11] 3,582,683

[72] Inventor George V. Podraza
Canoga Park, Calif.
[21] Appl. No. 751,596
[22] Filed Aug. 9, 1968
[45] Patented June 1, 1971
[73] Assignee The Bunker-Ramo Corporation
Canoga Park, Calif.

[54] OPTIONALLY CLOCKED TRANSISTOR CIRCUITS
15 Claims, 6 Drawing Figs.

[52] U.S. Cl. .......... 307/251, 307/214, 307/215, 307/269, 307/243
[51] Int. Cl. .......... H03k 17/00
[50] Field of Search .......... 307/214, 215, 243, 251, 269

[56] References Cited
UNITED STATES PATENTS

| | | | |
|---|---|---|---|
| 3,393,325 | 7/1968 | Borrer et al. .......... | 307/246 |
| 3,395,291 | 7/1968 | Bogert .......... | 307/214 |
| 3,479,523 | 11/1969 | Plesko .......... | 307/251 |
| 3,480,796 | 11/1969 | Polkinghorn et al. .......... | 307/251 |
| 3,431,433 | 3/1969 | Ball et al. .......... | 307/247 |

OTHER REFERENCES

"Muliphase Clocking Achieves 100-N-Sec MOS Memory" by Boysel and Murphy, Electronics Design News pp. 50— 55 June 10, 1968.

*Primary Examiner*—Donald D. Forrer
*Assistant Examiner*—Harold A. Dixon
*Attorney*—Frederick M. Arbuckle

ABSTRACT: Inverting switching and logic function circuits for digital equipment are provided in networks with an option for phase clocking by including first and second insulated-gate (MOS), field-effect transistors having their source connected to the functional circuit output terminal. The drain and gate of the first transistor are adapted to be connected to a clock source for clocked mode of operation and to circuit ground for nonclocked mode of operation. The gate of the first transistor is also so connected to the functional circuit as to provide circuit ground thereto permanently for a nonclocked mode of operation, and to provide clock pulses thereto for a clocked mode of operation, such that the functional circuit is biased off in reference to circuit ground potential during clock pulses to charge stray capacitance at the functional circuit output terminal, but enabled as a function of one or more input signals between clock pulses to discharge the stray capacitance. The second transistor connected to the output terminal is adapted to be biased for conduction as a load transistor when the first transistor is connected to circuit ground such that the stray capacitance is then charged through the load transistor and discharged through the circuit as a function of one or more input signals in a nonclocked mode of operation for the network.

INVENTOR.
GEORGE V. PODRAZA
BY Lindenberg & Freilich

INVENTOR.
GEORGE V. PODRAZA
BY
Lindenberg + Freilich

OPTIONALLY CLOCKED TRANSISTOR CIRCUITS

BACKGROUND OF THE INVENTION

1. Field of the Invention

This invention relates to transistor circuits, particularly but not necessarily for use in integrated circuit modules.

2. Description of the Prior Art

The insulated-gate (MOS), field-effect transistor structure is often referred to as an MOSFET structure because the field-effect transistor (FET) employs a metal gate vapor deposited on an oxide film over the semiconductor material which comprises the transistor channel. The drain and source are, of course, in ohmic contact with the channel on opposite sides of the gate. Thus, the structure provides a high input resistance at the gate without regard to the magnitude or polarity of the input signal. This permits direct coupling in digital circuits. This alone recommends the structure for widespread use in digital equipment.

Another advantage of the MOSFET structure is that it lends itself well to integrated circuit technologies which had been previously developed just for production of planar junction transistors and then for integrated circuits (IC's) comprising junction transistors. Indeed, the whole process is less complicated for MOSFET structured IC's because even complex circuits consist only of MOSFET devices. For example, a flip-flop may comprise simply two cross-coupled devices without any resistors or capacitors. The load for each side of the flip-flop consists of only one additional device having its gate either returned to the drain or connected to a separate gate supply voltage, usually to achieve operation with lower power and higher speed.

A major disadvantage of the MOSFET structured IC is its inability to operate much above a few MHz without complex, multiphase clocking, and even with four-phase clocking, operation is limited to about two orders of magnitude less than the intrinsic cutoff frequency of the MOSFET structure of at least one GHz. This is so primarily because stray capacitance of the circuit connected to the drain of an inverter must be charged through the load and discharged through the active MOSFET element. Stray capacitance referred to herein is the total capacitance seen at the circuit output node, and is comprised of inherent capacitance of the circuit devices, interconnection capacitances, and capacitances of the loads (usually in the form of insulated gates of other transistors) connected to said circuit node. The resistance of the load is usually much larger than the active element so that the switch-off time is usually several times longer than the switch-on time. Thus, the load RC time constant is the limiting factor.

Although new developments in materials and processing techniques will likely increase the speeds of MOSFET structured IC's, for some time to come circuit design techniques must be relied upon for increased speeds. One such technique is, as suggested hereinbefore, multiphase clocking. In its simplest form, such clocking consists of turning on the load MOSFET device to quickly charge the stray capacitance of the circuit connected to the junction between the load MOSFET device and the active MOSFET element. Following that, the input signal applied to the gate of the active element either turns it on to discharge the stray capacitance or not, depending upon whether the input signal is 0 volts or some level over the pinchoff or threshold voltage. Although this simple circuit functions only as an inverter, other active elements may be added in various configurations to form NAND gates, NOR gates, flip-flops, and the like, commonly employed to structure complex functional blocks on a single IC chip.

It is desirable to so design functional blocks in modules that sufficient widespread use will result to justify large production runs, and thereby reduce the cost of production. For example, one approach to designing modules for a parallel digital computer is to construct all of the components associated with a given binary position on one chip. Then the only difference between assembling a 20 bit computer and a 40 bit computer, for example, is the number of modules assembled. However, the design should then contemplate a multiphase clock system adequate for all manner of systems to be assembled by this bit-slice approach. If modules are to be designed for more universal use, it becomes even more important to provide flexibility in the multiphase clocking arrangement. For instance, a given functional electronic block may not require phase clocking in some applications where speed is not required. But even in bit-slice modules designed for assembly of computers of various sizes, a computer for one application may not require the speed demanded of another computer of the same size in another application. Thus, unless two types of modules are to be made available in all instances, one with phase clocking and one without for use where it can be spared, it becomes important to be able to provide optional use of the one type of module produced.

In applications where there is an emphasis on low power consumption for a system employing MOSFET structured circuits, and similarly structured circuits, (i.e., circuits employing devices having similar characteristics regarding high input impedance with significant stray capacitance at the circuit output terminal), lower power can be achieved by employing the clocking technique than by use of a DC biased load transistor. This is because power is consumed in the clocking arrangements that are considered herein only when charging the stray capacitance through the transistor to which the clock signal is applied. In the case of DC biased load transistor, continuous power dissipation results when one or more of the switching or logic transistors is on because of the current flow through that transistor or transistors and the load. Consequently, when low consumption is desired in a system clocking may be used to advantage even at relatively low operative speeds.

OBJECTS AND SUMMARY OF THE INVENTION

An object of this invention is to provide an option for phase clocking functional circuits employing devices having high input impedance characteristics and having significant stray capacitance at output terminals thereof.

Another object of this invention is to provide an option for phase clocking complex functional circuits employing devices having high input impedance characteristics and significant stray capacitance at output terminals thereof.

According to the invention, a functional circuit comprising either: a single common source insulated-gate, field-effect transistor having its drain connected to an output terminal or a device having similar characteristics; a plurality of such transistors in parallel for a NOR gate; a plurality of such transistors in series to form a NAND gate; a plurality of such transistors in series and in parallel for complex logic functions; or a plurality of such transistors in a selective switching arrangement, e.g., a selector tree or the like is provided in a network with an option for phase clocking to quickly charge stray capacitance connected to its output terminal in response to a clock pulse, and thereafter quickly discharge the stray capacitance through the circuit as a function of one or more input signals thereto, or for not phase clocking, in which case the stray capacitance is charged through a load transistor.

The option is provided by a first high-input-impedance device, such as an insulated-gate, field-effect transistor having its source connected to the circuit output terminal to which stray capacitance is connected. The drain and gate of the transistor are adapted to be connected to a clock source for a clocked mode of operation and to circuit ground for a non-clocked mode of operation. The gate of the transistor is also so connected to the circuit as to provide circuit ground thereto permanently for a nonclocked mode of operation and to provide clock pulses thereto for a clocked mode of operation such that circuit ground provided by the clock source is removed during clock pulses to charge the stray capacitance and restored to discharge the stray capacitance as a function of one or more input signals between clock pulses. A second similar device or transistor is connected to the output terminal and adapted to be biased for conduction as a load transistor for the circuit when the first transistor is connected to circuit ground such that the stray capacitance is then charged through the load transistor and discharged through the circuit as a function of one or more input signals.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
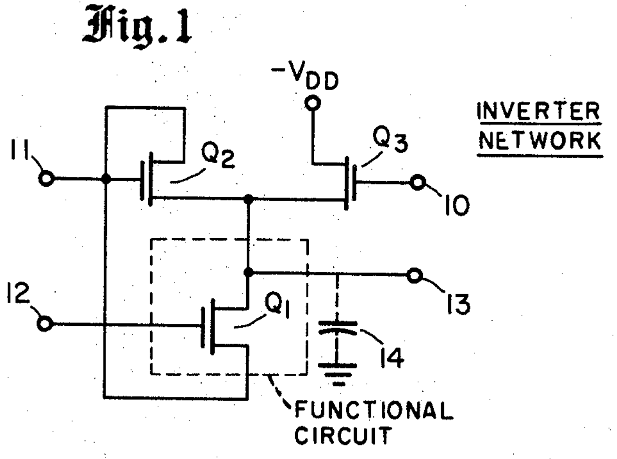
FIG. 1 illustrates schematically an improved MOSFET structured inverter with an option for phase clocking in accordance with the present invention.

In a preferred embodiment of the invention as shown in FIG. 1, an MOSFET structured inverter comprising transistor $Q_1$ is provided as a functional circuit in a network with a transistor $Q_2$ in the drain circuit thereof for use as a phase clocked inverter, and a load transistor $Q_3$ for optional use of transistor $Q_1$ as an inverter without clocking. Only the drain of the transistor $Q_3$ is connected to a drain supply voltage $V_{DD}$. The drain of the transistor $Q_2$ is returned to the gate thereof which is connected to the source of the transistor $Q_1$. In operation, either the transistor $Q_2$ or the transistor $Q_3$ is inactivated by connecting its gate to a source of 0 volts (circuit ground). If transistor $Q_3$ is inactivated the gate of the transistor $Q_2$ is connected to a multiphase clock source through a terminal 11 which provides substantially 0 volts (circuit ground) to the source of the transistor $Q_1$ and to the gate of the transistor $Q_2$ until a phase clock pulse occurs.

In this preferred embodiment, the transistors are of the *p*-channel, enhancement-mode type and the clock pulses are negative (−24 volts). The binary signals applied to the gate of transistor $Q_1$ through a terminal 12 are 0 to −2 volts for binary 0 and −9 to −12 volts for binary 1. However, the binary voltage levels will be defined hereinafter to be 0 and −12 volts for binary 0 and binary 1, respectively. The drain of the transistor $Q_1$ provides an inverted output signal (a complement of the binary input signal) through a terminal 13.

If the inverter is to function as a switch in high speed digital equipment, regard must be given to the speed with which stray capacitance 14 can be charged to a binary 1 (−12 volts) and discharged to a binary 0 (0 volts). Such stray capacitance is generally very large between MOSFET structures if not on the same semiconductor chip. However, even in an integrated circuit contained on a single chip, the stray capacitance of the circuit connected to terminal 13 may be sufficiently large to warrant use of phase clocking to speed up charging of the stray capacitance when the output terminal is to be switched from a binary 1 to a binary 0 (−12 volts) in response to a binary 0 signal at the input terminal 12.

Figure 2:
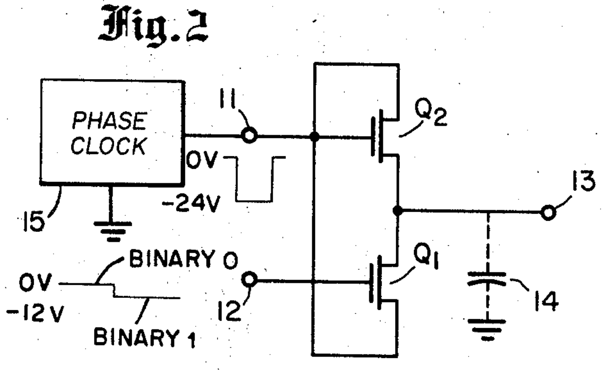
FIG. 2 illustrates by a circuit diagram how the structure of FIG. 1 is used in a clocked mode of operation.

If the circuit of FIG. 1 is to be employed as a phase clocked inverter, the gate of transistor $Q_3$ is connected to circuit ground through terminal 10, as noted hereinbefore, thereby cutting off transistor $Q_3$ to effectively remove it from the circuit. Transistors $Q_1$ and $Q_2$ remain as active elements in the configuration illustrated in FIG. 2. In that configuration, the output terminal 13 is isolated from ground if a binary 0 (0 volts) signal is present at terminal 12 since the source of the transistor $Q_1$ is connected to circuit ground through terminal 11 and a phase clock source 15 until the next negative (−24 volts) clock pulse occurs. If the input signal at terminal 12 is still a binary 0 when the next clock pulse occurs, the output terminal 13 will remain at a negative voltage level because transistor $Q_1$ remains cut off. The transistor $Q_2$, on the other hand, will be switched on by the clock pulse which drives the gate thereof more negative than the source. The drain supply voltage for the transistor $Q_2$ is also provided by the phase clock pulse. In that manner, the transistor $Q_2$ will charge the stray capacitance 14 to approximately −16 volts if it is not already charged to that level.

The transistor $Q_2$ is designed to provide relatively low resistance (high transconductance) when turned on in order to minimize the RC time constant for the charging current therethrough. The clock pulse is then made sufficiently negative to enable the stray capacitance 14 to charge to a level of at least between −9 and −12 volts from 0 volts. If the capacitor is already charged, or partially charged to that level, it may charge more negatively to a level of −20 volts (−24 volts less the threshold voltage of the transistor $Q_2$ which is approximately 4 volts). Thus, the stray capacitance 14 may be charged to any level from about −12 volts to −20 volts with an average of −16 volts. Charging the stray capacitance beyond the −12 volt level employed to represent a binary 1 will aid in speeding up the operation of any switch connected to the output terminal 13.

If the input signal is a binary 1, the transistor $Q_1$ will conduct immediately following the phase clock since the source of the transistor $Q_1$ is then returned to 0 volts, thereby allowing the stray capacitance 14 to quickly discharge to circuit ground through the phase clocked source 15. In summary, the stray capacitance 14 is charged to an average −16 volts upon the occurrence of each phase clock pulse and will remain charged unless the input signal is a binary 1 in which case it is quickly discharged to substantially circuit ground level (between 0 and −2 volts). In practice, the transconductance of transistor $Q_2$ is selected to be equal to the transconductance of transistor $Q_1$ so that the RC time constant for charging is the same as for discharging.

Figure 3:
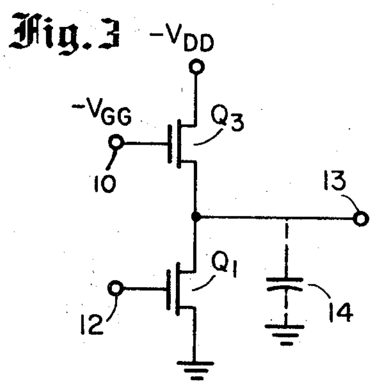
FIG. 3 illustrates by a circuit diagram how the structure of FIG. 1 is used in a nonclocked mode of operation.

If the MOSFET structured inverter of FIG. 1 is to be employed in an application which does not require high switching speeds or relatively low power, the input terminal 11 is connected to circuit ground thereby holding off the transistor $Q_2$ leaving only transistors $Q_3$ and $Q_1$ active in a configuration shown in FIG. 3. In that configuration, the gate of the transistor $Q_3$ is connected to a gate supply voltage $V_{GG}$ of, for example, −24 volts. If the input signal at terminal 12 is then a binary 1, the stray capacitance 14 quickly discharges through the transistor $Q_1$. When the input signal changes to a binary 0, the transistor $Q_1$ is cut off and the stray capacitance 14 is charged to −12 volts through the transistor $Q_3$. The time constant for the transition of the output terminal 13 from 0 volts to −12 volts is then determined by the resistance of the load transistor $Q_3$ and the total capacitance to be charged. In practice, the transconductance of the transistor $Q_3$ is selected to be 10 to 20 times less than the transconductance of the transistor $Q_1$ to insure its saturation.

Figure 4:
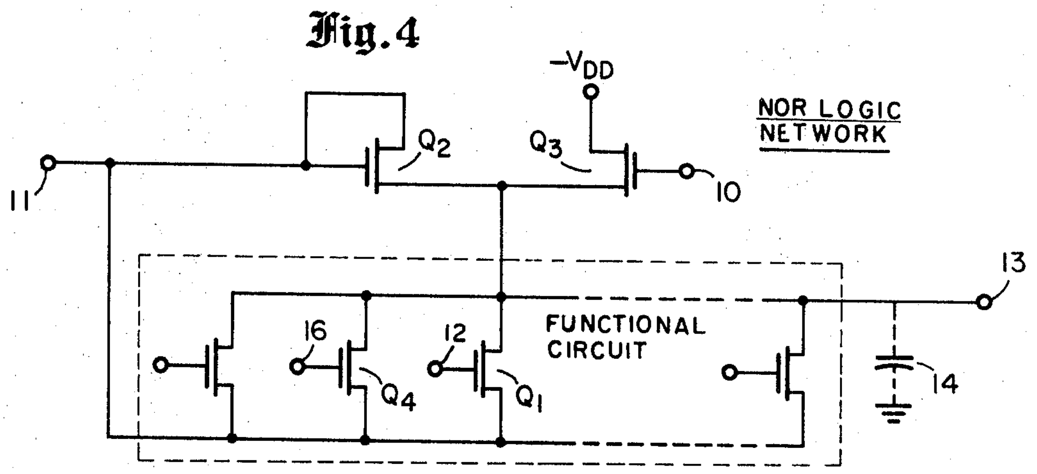
FIG. 4 illustrates the manner in which the structure of FIG. 1 may be used to form a NOR gate.

FIG. 4 illustrates the manner in which the MOSFET inverter structure of FIG. 1 is to be employed to form a more complex functional circuit namely a NOR circuit in a network with an option for phase clocking in accordance with the present invention. To facilitate understanding the operation of the NOR circuit in each of its two optional modes, common reference characters are employed to identify elements common to the basic MOSFET structured inverter of FIG. 1. Thus, it may be readily seen that the only difference is the provision of a plurality of transistors in parallel with the switching transistor $Q_1$, such as a transistor $Q_4$. The signal transmitted at the output terminal 13 will be 0 volts if a binary 1 is present at an input terminal connected to the gate of any of the transistors, such as an input terminal 16 connected to the gate of transistor $Q_4$, and −12 volts (average −16 volts for the phase clocked mode)

only if a binary 0 is present at each of the input terminals connected to the gates of all of the transistors in parallel with the transistor $Q_1$, including the transistor $Q_1$.

In the phase clock mode, the terminal 10 of the NOR circuit in FIG. 4 is connected to circuit ground and the terminal 11 is connected to a phase clock source. The drain supply voltage $V_{DD}$ for the transistor $Q_3$ may, of course, be omitted. Upon the occurrence of a negative phase clock pulse, the stray capacitance 14 is quickly charged through transistor $G_2$ to an average −16 volts. Immediately upon termination of the phase clock pulse, the capacitor 14 is quickly discharged to 0 volts through the clock source if a binary 1 signal is present at an input terminal connected to any of the transistors such as the input terminal 12 connected to the transistor $Q_1$. If a binary 1 signal is not present on any of the input terminals connected to the switching transistors in parallel with the transistor $Q_1$, including the transistor $Q_1$, the stray capacitance 14 will remain charged to the average −16 volts.

In the nonclocked mode of operation, the terminal 10 is connected to a gate supply voltage $V_{GG}$ of approximately −24 volts while the drain of the transistor $Q_3$ is connected to a drain supply voltage $V_{DD}$ of approximately −12 volts. The terminal 11 is then connected to circuit ground thereby effectively removing transistor $Q_2$ from the circuit leaving a plurality of transistors in parallel with the transistor $Q_1$ and the load transistor $Q_3$. A binary 1 signal present at any one of the input terminals, such as the input terminal 10, will cause the transistor connected thereto to conduct and quickly discharge the stray capacitance 14 to 0 volts. When all of the input signals become binary 0, all of the transistors in parallel are cut off and the stray capacitance 14 will be charged to −12 volts through the load transistor $Q_3$. As in the basic MOSFET structured inverter illustrated in FIG. 1, the charging time constant is determined by the value of the stray capacitance 14 and the resistance of the transistor $Q_3$.

The basic MOSFET inverter structure having an option for phase clocking in accordance with the present invention may be employed to provide more complex functional circuits, such as providing a half-adder function, as will be described with reference to FIG. 5, or providing a functional circuit for selectively switching one of a plurality of input signals to an output terminal, as will be described with reference to FIG. 6.

Figures 5, 6:
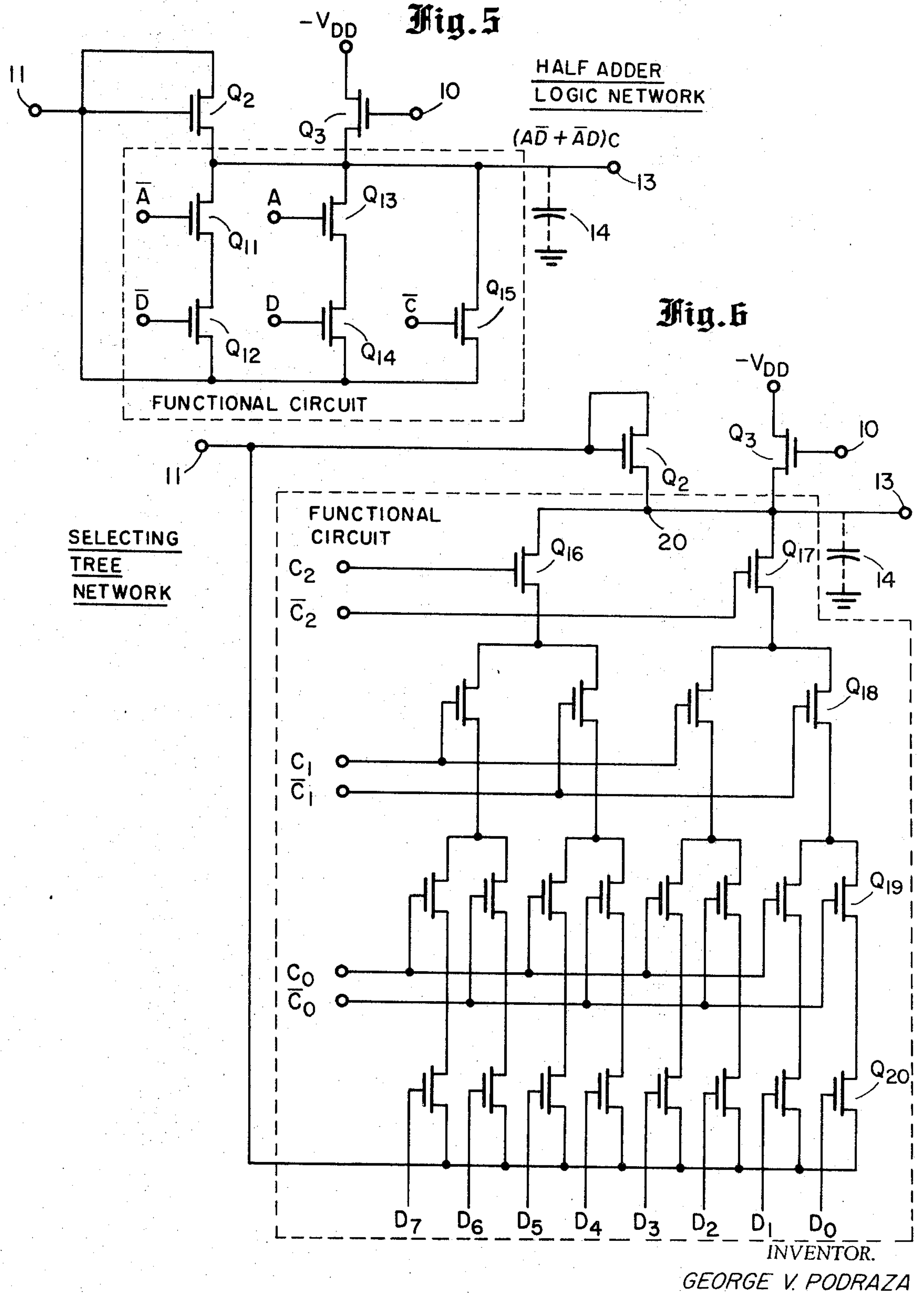
FIG. 5 illustrates the manner in which the structure of FIG. 1 may be used to implement a given logical function.
FIG. 6 illustrates the manner in which the structure of FIG. 1 may be used to structure a three-stage, two branch selecting tree.

Referring now to FIG. 5, the logical function $(A\bar{D}+\bar{A}D)C$ is readily implemented with the structure of FIG. 1 by substituting for the inverting transistor $Q_1$, (which has a simple function of simply complementing an input signal) with a more complex logic network for providing the function indicated which, it will be recognized, is half the logic network required to develop a carry from the sum of the augend A and the addend D of a given binary order and a carry C from the next lower order. For convenience, the transistors $Q_{11}$ through $Q_{15}$ employed to implement this function are shown with their respective gates connected to input terminals connected to sources of the appropriate signals and complements thereof as indicated by the widely used convention of reference letters A, $\bar{A}$, D, $\bar{D}$ and C for the respective terminals.

In the phase clocked mode of operation, the input terminal 10 of the transistor $Q_3$ in FIG. 5 is connected to circuit ground while the input terminal 11 is connected to a phase clock source. Upon the occurrence of a phase clock pulse the transistor $Q_2$ will conduct to charge the stray capacitance 14 to an average −16 volts. Thereafter, the capacitance will remain charged to maintain the output terminal 13 at a binary 1 only if the indicated function is true. If it is not true, such as when A and D are both true, or A and D are both false, one of the three branches in parallel with the stray capacitance 14 will be conductive to quickly discharge the stray capacitance 14 to 0 volts thereby providing a binary 0 at the output terminal 13. If the function indicated is true, the complement of the carry signal $\bar{C}$ will be 0 volts to keep the transistor $Q_{15}$ cut off. Similarly, if either A or D is true, then one of the transistors in each of the remaining branches will remain cut off, thereby leaving the stray capacitance 14 charged to an average −16 volts. Thus, the stray capacitance 14 is quickly charged by a phase clock pulse at terminal 11 and thereafter, quickly discharged only if the indicated function is not true.

In the nonclocked mode of operation, the terminal 11 is connected to ground and the terminal 10 is connected to a gate supply voltage $V_{GG}$ of −24 volts while the drain of transistor $Q_3$ is connected to a drain supply voltage of −12 volts. The output terminal 13 is quickly switched to 0 volts if the indicated function is false by conduction through one or more of the three branches in parallel with the stray capacitance 14. Upon the function becoming true, all conduction through the three branches will be cut off and the stray capacitance 14 will then charge to approximately −12 volts through the load transistor $Q_3$.

As in the basic MOSFET structured inverter of FIG. 1, the time required for the capacitance 14 to charge to −12 volts will depend upon the values of the stray capacitance and the resistance of the transistor $Q_3$. In order that for either mode of operation the stray capacitance 14 be permitted to discharge through any one of the three paths with the same time constant, the sum of the resistances in the branch comprising transistors $Q_{11}$ and $Q_{12}$ and the branch comprising the transistors $Q_{13}$ and $Q_{14}$ should be equal to the resistance of the branch comprising transistor $Q_{15}$.

To complete generation of the carry, a separate logic network is required for generating first the function AD and then, in response to that function and the function generated by the circuit illustrated in FIG. 5, generating the combined (ORed) function of both, namely the function $(A\bar{D}+\bar{A}D)C+AD$. At each logic level, a phase clock mode of operation is employed only if a phase clocked mode of operation was elected for generating the function $(A\bar{D}+\bar{A}D)C$, and if a phase clocked mode of operation is elected, the two logic levels required to generate the combined function $(A\bar{D}+\bar{A}D)C+AD$ would be synchronized by phase clocks occurring at successive periods, rather than simultaneously, as is well known to those skilled in the art.

Referring now to FIG. 6, a three-stage, two-branch selecting tree is substituted for the switching transistor $Q_1$ in the basic MOSFET structured inverter illustrated in FIG. 1 to provide still another embodiment of the present invention. Again for convenience, the elements common to the basic structure of FIG. 1 are identified by the same reference characters. Control terminals are provided to receive control signals $C_0$, $C_1$ and $C_2$ and complements thereof as indicated by the convention of referring to the terminals by the same reference characters $C_0$, $\bar{C}_0$, $C_1$, $\bar{C}_1$, $C_2$ and $\bar{C}_2$. Those control signals are employed to selectively invert and transmit a binary signal from one of a plurality of sources connected to input terminals $D_0$ through $D_7$. Thus, three control signals will turn three transistors on in series to provide a current path for transmission of an inverted signal to the output terminal 13 from a selected input terminal. For instance, the control signal $C_2$ or its complement selectively turns on one of two transistors $Q_{16}$ and $Q_{17}$. If the complement of the signal at the input terminal $D_0$ is to be selectively transmitted to the output terminal 13, transistors $Q_{18}$ and $Q_{19}$ are similarly turned on by control signals $\bar{C}_1$ and $\bar{C}_0$.

In the phase clocked mode of operation, the transistor $Q_3$ is effectively removed from the circuit by connecting terminal 10 to circuit ground. The stray capacitance 14 is then charged by transistor $Q_2$ in response to a phase clock at terminal 11. Thereafter, when the terminal 11 is returned to 0 volts by the clock pulse source connected thereto, the stray capacitance will discharge through the selected path $Q_{17}$, $Q_{18}$ and $Q_{19}$ if the signal at the input terminal $D_0$ is true to turn transistor $Q_{20}$ on. Otherwise, the stray capacitance remains charged at an average −16 volts to transmit from the output terminal 13 a binary 1 signal in response to a binary 0 signal at the input terminal $D_0$.

In the nonclocked mode of operation, the input terminal 11 is connected to circuit ground while the input terminal 10 is connected to a gate supply voltage $V_{GG}$ of approximately −24 volts while the drain of transistor $Q_3$ is connected to a drain supply voltage $V_{DD}$ of −12 volts. Assuming again that the signal present at the input terminal $D_0$ has been selected by the control signals to be inverted and transmitted to the output terminal 13, any charge on the stray capacitance 14 is discharged through transistors $Q_{17}$ to $Q_{20}$ if the input signal is true to provide a false output signal at terminal 13. If the input signal changes to a binary 0, or the control signals select an input signal from one of the remaining input terminals $D_1$ to $D_7$ which is false, all discharge paths for the stray capacitance 14 will be cut off. The stray capacitance 14 will then charge through the load transistor $Q_3$. Again, as before, the charging time constant is determined by the values of the stray capacitance 14 and the resistance of the transistor $Q_3$. Thus, a selecting tree having any number of desired stages with two branches per node is provided with the option for phase clocking in accordance with the present invention to speed up the charging of the stray capacitance 14. As an alternative, a larger number of branches may be provided for each node in order to reduce the number of stages required. If that is done, partial decoding of the control signals will be required, as may be readily appreciated by those skilled in the art, such that each control terminal will receive a signal which is a unique function of, for example, two control signals for a four-branch, two-stage selecting tree.

From the foregoing it may be readily appreciated that any inverting switch or logic network may be provided for the transistor $Q_1$ and although the switch or logic network is preferably structured from MOSFET devices in an IC, other devices may be employed to equal advantage provided only that it be biased off by a clock pulse regardless of the input signal or signals thereto, and be biased for conduction as a function of the input signal or signals in the absence of a clock pulse. For instance, transistor $Q_1$ in FIG. 1 may be a PNP junction transistor, or a complex logic or switching network of PNP junction transistors of the leakage current $I_{CO}$ of the junction transistor can, in a particular application, be tolerated. It should also be appreciated that *n*-channel devices may be employed as readily as *p*-channel devices by proper selection of the polarity of the bias voltage $V_{DD}$ and signals, including the clock pulses.

The embodiments of the invention which an exclusive property or privilege I claim are defined as follows:

1. In a network having a functional circuit for transmitting a signal from an output terminal thereof as a function of at least one input signal, at an input terminal thereof, said output terminal having substantial stray capacitance connected thereto, the combination comprising:

a first high-input-impedance device for controlling the flow of current between first second terminals thereof in response to a voltage signal at a third terminal, source means providing clock pulses, said second and third terminals being selectively connected to said source means for optionally clocking operation of said functional circuit, or to circuit ground for optionally not clocking operation of said functional circuit, means connecting said third terminal to said functional circuit, said source means providing clock pulses of a polarity and amplitude sufficient to bias off said functional circuit and charge said stray capacitance when a clock pulse is present regardless of said input signal, and to bias on said functional circuit when said clock is not present to discharge said stray capacitance in accordance with said input signal; and a second high-input-impedance device for controlling the flow of current between first and second terminals thereof in response to a bias voltage at a third terminal; said first terminal of said second device being connected to said output terminal; bias potential source means; means selectively connecting said second and third terminals of said second device to said bias potential source means and also connecting said third terminal to circuit ground for biasing said second device and said functional circuit so as to permit said stray capacitance to be charged through said second device when said input signal has a first value and so as to permit said stray capacitance to be discharged by said functional circuit when said input signal has a second value, whereby an option for not clocking said functional circuit is provided.

2. The combination as defined in claim 1 wherein said first device is an insulated-gate, field-effect transistor, said first and second terminals comprise the respective source and drain thereof, and said third terminal comprises the gate thereof, and said second device is an insulated-gate, field-effect transistor, said first and second terminals of said second device comprise the respective source and drain thereof, and said third terminal of said second device comprises the gate thereof.

3. The combination as defined in claim 2 wherein said functional circuit is comprised entirely of insulated-gate, field-effect transistors.

4. The combination as defined in claim 2 wherein said functional circuit comprises at least one insulated-gate, field-effect transistor having its source connected to the gate of said first device, its drain connected to said output terminal, and its gate adapted to be connected to a signal source.

5. The combination as defined in claim 2 wherein said functional circuit comprises a plurality of insulated-gate, field-effect transistors, each having its source connected to the gate of said first device, its drain connected to said output terminal, and its gate adapted to be connected to a separate signal source.

6. The combination as defined in claim 2 wherein said functional circuit comprises:

at least one insulated-gate, field-effect transistor having its source connected to the gate of said first device, its drain connected to said output terminal, and its gate adapted to be connected to a signal source; and at least one pair of field-effect transistors connected in series, the source of one connected to the gate of said first device, the drain of the other connected to said output terminal, and the gate of each adapted to be connected to a separate signal source.

7. The combination as defined in claim 2 wherein said functional circuit comprises a plurality of insulated-gate, field-effect transistors connected in series, the source of one connected to the gate of said first device, the drain of each but the last connected to the source of the next, the drain of the last connected to said output terminal, and the gate of each being adapted to be connected to a separate signal source.

8. The combination as defined in claim 2 wherein said functional circuit is a multibranch, multistage selector tree comprised entirely of insulated-gate, field-effect transistors, each stage but the first comprising a transistor in each branch, each transistor having its source connected to a node of a preceding stage and its gate being adapted to be connected to a separate control signal source, the first stage comprising a transistor in each branch having its source connected in series with an input transistor and its gate being adapted to be connected to a separate control signal source, each input transistor having its source connected to the gate of said first transistor and its gate being adapted to be connected to a separate data signal source, and the last stage having its node connected to said output terminal, whereby a data source signal is selectively transmitted in complementary form from said output terminal in response to signals from said control signal sources.

9. In an MOSFET structured functional network having at least one transistor in a functional circuit to be selectively switched on by a digital signal to provide at its drain 0 volts, and switched off by the binary complement of said digital signal to provide at its drain some predetermined minimum voltage, apparatus for optionally clocking operation of said network comprising:

a first transistor having its source connected to the drain of said one transistor, its drain connected to a supply voltage substantially equal to said minimum voltage, and its gate adapted to be connected to a first source of bias voltage of the same polarity as said drain voltage and of a value equal to at least the voltage of said drain supply voltage for operation of said circuit in a nonclocked mode, and to a second source of bias voltage sufficient to cut off current through the drain of said first transistor for operation of said circuit in a clocked mode;

a second transistor having its source connected to the drain of said one transistor and its drain connected to its gate; and direct current means connecting the gate of said second transistor to the source of said one transistor, the gate of said second transistor being adapted to be connected to a source of 0 volts for operation of said circuit in a nonclocked mode, and to a source of clock pulses of a polarity and amplitude for switching said second transistor into conduction at saturation for operation of said circuit in a clocked mode.

10. Apparatus as defined in claim 9 wherein said first source of bias voltage is equal to twice the value of said drain supply voltage, and said second source of bias voltage is 0 volts.

11. Apparatus as defined in claim 9 wherein said clock pulse source returns the gate of said second transistor to substantially 0 volts between pulses.

12. Apparatus as defined in claim 9 wherein said circuit comprises said one transistor having its drain connected to the sources of said first and second transistors, and said coupling means comprises a direct connection between its source and the gate of said second transistor.

13. Apparatus as defined in claim 9 wherein said circuit comprises a plurality of transistors connected in series, said one transistor being at one end of the series, and said coupling means comprises a direct connection between the source of the one of said plurality of transistors at the other end of the series and the gate of said second transistor.

14. Apparatus as defined in claim 13 including a second plurality of transistors connected in series, said second series being connected in parallel with said first series.

15. Apparatus as defined in claim 13 including a second plurality of transistors connected in series, said second series being connected in parallel with a portion of said first series.